United States Patent
Wenstrup et al.

(10) Patent No.: US 7,153,794 B2
(45) Date of Patent: Dec. 26, 2006

(54) HEAT AND FLAME SHIELD

(75) Inventors: David E. Wenstrup, Greer, SC (US); Gregory J. Thompson, Simpsonville, SC (US); Jason G. Chay, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/841,148

(22) Filed: May 7, 2004

(65) Prior Publication Data

US 2005/0250406 A1    Nov. 10, 2005

(51) Int. Cl.
B32B 7/02    (2006.01)
D04H 1/00    (2006.01)
D04H 1/54    (2006.01)

(52) U.S. Cl. ............ 442/415; 442/409; 442/414; 428/212; 428/218; 428/920; 428/921

(58) Field of Classification Search .......... 442/387, 442/388, 403
See application file for complete search history.

(56) References Cited

U.S. PATENT DOCUMENTS

| | | | |
|---|---|---|---|
| 3,073,735 A | 1/1963 | Till et al. ............. | 156/38 |
| 3,740,797 A | 6/1973 | Farrington ............ | 19/156.3 |
| 3,772,739 A | 11/1973 | Lovgren ............... | 19/156.3 |
| 3,837,995 A | 9/1974 | Floden ................. | 161/150 |
| 4,018,646 A | 4/1977 | Ruffo et al. .......... | 162/146 |
| 4,082,886 A | 4/1978 | Butterworth et al. .. | 428/284 |
| 4,127,698 A | 11/1978 | Shimizu et al. ....... | 428/373 |
| 4,194,037 A * | 3/1980 | Stoller ................. | 428/92 |
| 4,435,468 A | 3/1984 | TenEyck ............... | 428/285 |
| 4,863,797 A | 9/1989 | Ichibori et al. ....... | 428/359 |
| 4,931,357 A | 6/1990 | Marshall et al. ...... | 442/415 |
| 4,970,111 A | 11/1990 | Smith, Jr. ............. | 428/283 |
| 5,173,355 A | 12/1992 | Vock et al. ........... | 428/219 |
| 5,208,105 A | 5/1993 | Ichibori et al. ....... | 428/373 |
| 5,348,796 A | 9/1994 | Ichibori et al. ....... | 442/202 |
| 5,350,624 A | 9/1994 | Georger et al. ....... | 429/219 |
| 5,399,423 A | 3/1995 | McCullough et al. .. | 428/287 |
| 5,407,739 A | 4/1995 | McCullough et al. .. | 428/287 |
| 5,458,960 A | 10/1995 | Nieminen et al. ..... | 428/284 |
| 5,508,102 A | 4/1996 | Georger et al. ....... | 428/297 |
| 5,698,298 A | 12/1997 | Jackson et al. ....... | 428/198 |
| 5,723,209 A | 3/1998 | Borger et al. ......... | 248/219 |
| 5,766,745 A | 6/1998 | Smith et al. .......... | 428/218 |
| 5,856,243 A | 1/1999 | Geirhos et al. ....... | 442/57 |
| 5,942,288 A | 8/1999 | Kajander .............. | 427/389.7 |
| 6,346,491 B1 * | 2/2002 | DeAngelis et al. .... | 442/110 |
| 6,572,723 B1 | 6/2003 | Tilton et al. .......... | 156/219 |

(Continued)

FOREIGN PATENT DOCUMENTS

EP    0622332    11/1994

(Continued)

Primary Examiner—Jenna-Leigh Befumo
(74) Attorney, Agent, or Firm—Terry T. Moyer; Cheryl J. Brickey; Jeffrey E. Bacon

(57) ABSTRACT

A heat and fire resistant planar unitary shield formed of heat and flame resistant fibers and voluminous bulking fibers. The shield material has a heat and flame resistant zone with a majority of the heat and flame resistant fibers, and a voluminous bulking zone with a majority of the voluminous bulking fibers. The fibers are distributed through the shield material in an manner that the heat and flame resistant fibers collect closest to the outer surface of the shield with the heat and flame resistant zone, and the voluminous bulking fibers collect closest to the outer surface of the shield material with the voluminous bulking zone.

18 Claims, 3 Drawing Sheets

U.S. PATENT DOCUMENTS

| | | | |
|---|---|---|---|
| 6,586,353 B1 | 7/2003 | Kiik et al. | 442/320 |
| 6,609,261 B1 | 8/2003 | Mortensen et al. | 5/698 |
| 6,718,583 B1 | 4/2004 | Diaz | 5/698 |
| 6,764,971 B1 | 7/2004 | Kelly et al. | 442/408 |
| 6,797,653 B1 | 9/2004 | Fay | 442/85 |
| 6,823,458 B1 | 11/2004 | Lee et al. | 726/16 |
| 2003/0100239 A1 | 5/2003 | Gaffney et al. | 442/354 |
| 2003/0106560 A1 | 6/2003 | Griesbach et al. | 128/849 |
| 2003/0200991 A1 | 10/2003 | Keck et al. | 134/6 |
| 2003/0224679 A1 | 12/2003 | Ahluwalia | 442/72 |
| 2003/0228460 A1 | 12/2003 | Ahluwalia | 428/315.5 |
| 2004/0060118 A1 | 4/2004 | Diaz | 5/698 |
| 2004/0060119 A1 | 4/2004 | Murphy et al. | 5/698 |
| 2004/0062912 A1 | 4/2004 | Mason et al. | 428/139 |
| 2004/0091705 A1 | 5/2004 | Hanyon et al. | 428/373 |
| 2004/0102112 A1 | 5/2004 | McGuire et al. | 442/59 |
| 2004/0106347 A1 | 6/2004 | McGuire et al. | 442/361 |
| 2004/0158928 A1 | 8/2004 | Gladney | 5/698 |
| 2004/0185731 A1 | 9/2004 | McGuire | 442/141 |
| 2004/0198125 A1 | 10/2004 | Mater et al. | 442/394 |
| 2004/0242107 A1 | 12/2004 | Collins | 442/403 |
| 2004/0242109 A9 | 12/2004 | Tilton et al. | 442/415 |
| 2004/0259451 A1 | 12/2004 | Paradis et al. | 442/381 |
| 2005/0023509 A1 | 2/2005 | Bascom et al. | 252/608 |
| 2005/0026528 A1 | 2/2005 | Forsten et al. | 442/414 |

FOREIGN PATENT DOCUMENTS

| | | |
|---|---|---|
| JP | 7040487 | 2/1995 |
| WO | WO 03/023108 | 2/2003 |
| WO | WO 05/001187 | 1/2005 |

* cited by examiner

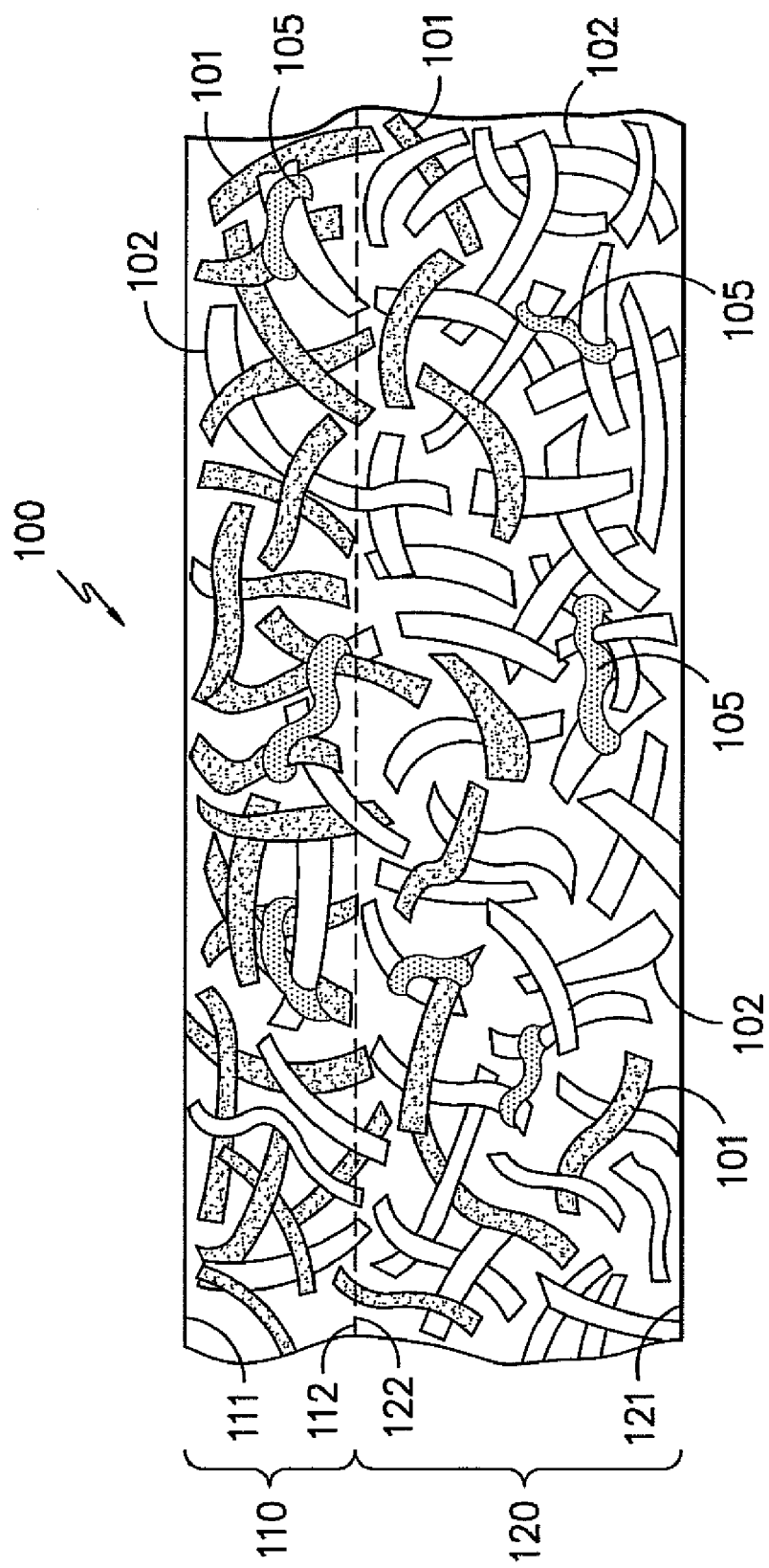
FIG. -1-

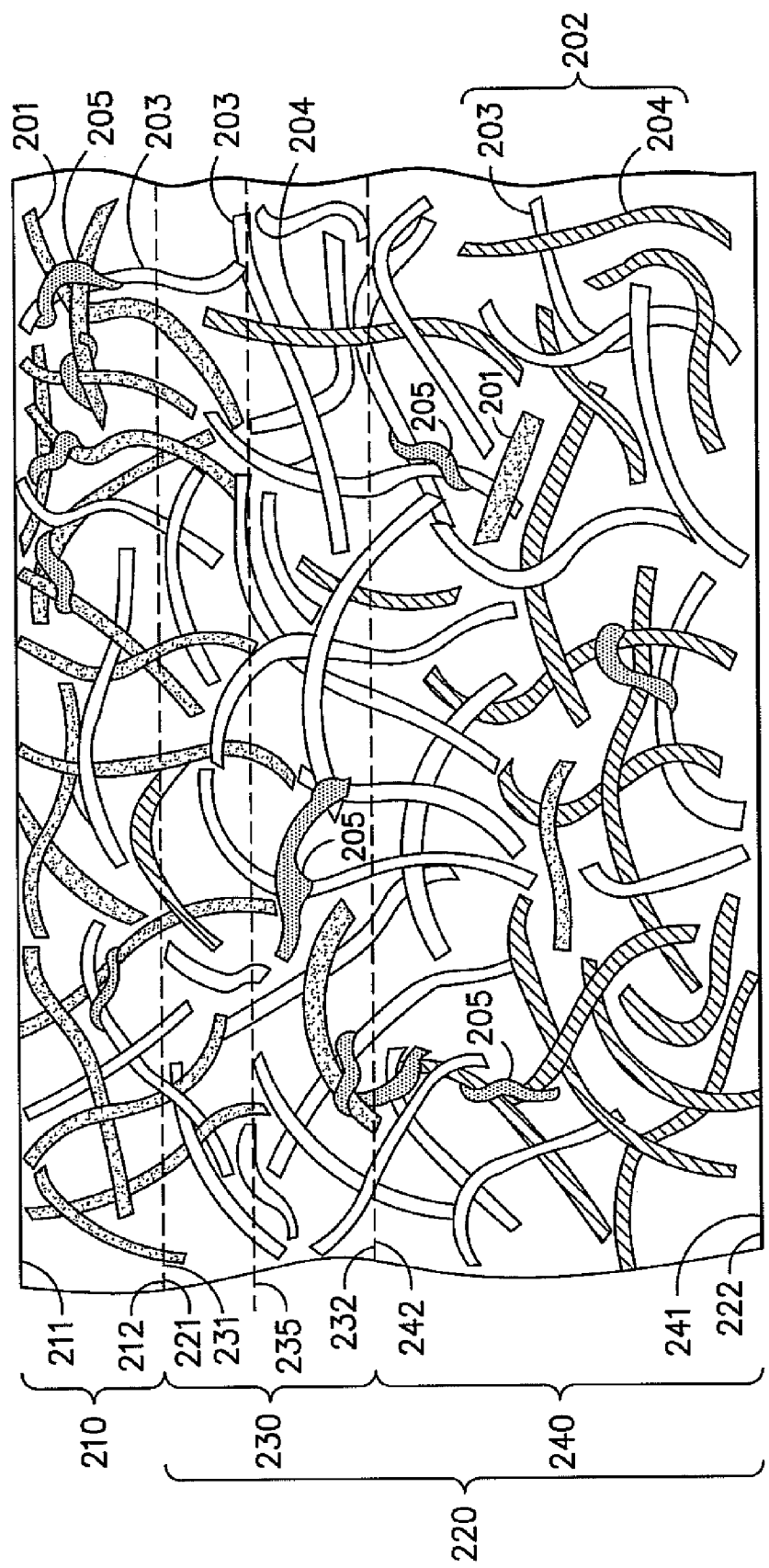
FIG. -2-

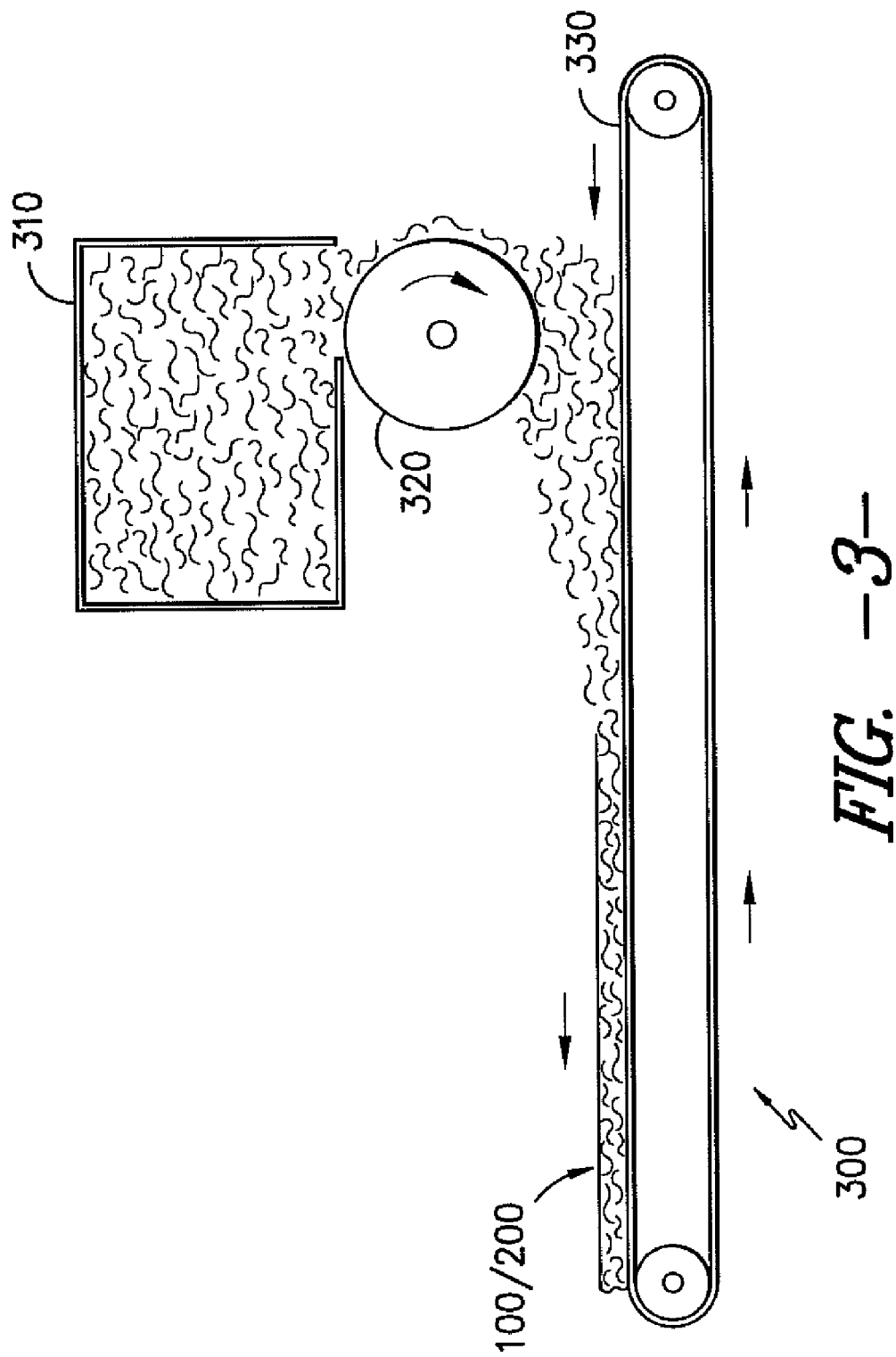

HEAT AND FLAME SHIELD

BACKGROUND

The present invention generally relates to materials for use in shielding from heat and/or flame, and in particular, heat and/or flame shielding material that can be used in applications such as hood liners for automobiles, engine compartment liners, and the like.

Numerous industries require materials which not only deliver heat and flame resistant properties, but can also provide volume, opacity, moldability, and other properties in a cost effective single substrate. Often times these barrier properties are best accomplished by using specialty materials which generate a high level of performance, but also introduce significant cost to the substrate. Especially in a voluminous substrate (high z direction thickness) even the introduction of a small percent of these materials into the shield material can introduce a significant level of cost to the overall substrate. For this reason composites having specialty surface layers are often used to provide these barrier properties. An example of a composite having specialty surface layers would be a skin laminated to a voluminous lower cost material. While this method effectively reduces the cost of the high cost raw material, there are disadvantages to this method such as additional processing steps and the potential delamination of the skin layer.

The present invention provides an alternative to the prior art by using a unitary heat shield material with different zones to provide the various desired properties of the material

BRIEF DESCRIPTION OF THE DRAWINGS

These and other features, aspects, and advantages of the present invention will become better understood with regard to the following description, appended claims, and accompanying drawings where:

FIG. 1 shows an enlarged cross-section of one embodiment of the present invention;

FIG. 2 shows an enlarged cross-sectional view of another embodiment of the present invention; and, FIG. 3 shows a diagram of a machine for performing a process for forming the planar heat and flame resistant shield material of the present invention.

DETAILED DESCRIPTION

Referring now to the figures, and in particular to FIG. 1, there is shown an enlarged cross-sectional view of an embodiment of the present invention, illustrated as a planar heat and flame shield material 100. The shield material 100 may be used in its existing sheet form as a protective blanket or shield in operations such as welding, high temperature manufacturing, or the like. The shield material 100 may also be formed into parts such as automotive hood liners, engine compartment covers, and the like. As illustrated, the planar shield material 100 generally contains heat and flame resistant fibers 101 and bulking fibers 102. The heat and flame resistant fibers 101 and the bulking fibers 102 are staple fibers that are combined to form the shield material 100. As used herein, heat and flame resistant fibers shall mean fibers having an Limiting Oxygen Index (LOI) value of 20.95 or greater, as determined by ISO 4589-1. Examples of heat and flame resistant fibers include the following: fibers including oxidized polyacrylonitrile, aramid, or polyimid, flame resistant treated fibers, carbon fibers, or the like. Bulking fibers are fibers that provide volume to the heat shield material. Examples of bulking fibers would include fibers with high denier per filament (one denier per filament or larger), high crimp fibers, hollow-fill fibers, and the like. In one embodiment, the heat and flame resistant fibers 101 and the bulking fibers 102 are air-laid with a binder fiber 105, and the combination of fibers is heated to activate the binder fiber 105 for bonding together the fibers of the shield material 100. An additional benefit of using the binder fiber 105 in the shield material 100 is that the shield material 100 can be subsequently molded to part shapes for use in automotive hood liners, engine compartment covers, etc.

Still referring to FIG. 1, the heat and flame resistant fibers 101 are concentrated in a heat and flame resistant zone 110 of the planar shield material 100, and the bulking fibers 102 are concentrated in a voluminous bulking zone 120 of the planar shield material 100. The heat and flame resistant zone 110 provides the shield material 100 with the primary heat and flame resistant attributes. The voluminous bulking zone 120 provides the shield material 100 with the desired z-direction thickness.

Referring still to FIG. 1, the heat and flame resistant zone 110 has an outer boundary 111 located at the outer surface of the shield material 100, and an inner boundary 112 located adjacent to the voluminous bulking zone 120. The voluminous bulking zone 120 has an outer boundary 121 located at the outer surface of the shield material 100 and an inner boundary 122 located adjacent to the heat and flame resistant zone 110. The shield material 100 is a unitary material, and the boundaries of the two zones do not represent the delineation of layers, but areas within the unitary material. Because the shield material 100 is a unitary material, and the heat and flame resistant zone 110 and the voluminous bulking zone 120 are not discrete separate layers joined together, various individual fibers will occur in both the heat and flame resistant zone 110 and the voluminous bulking zone 120. Although FIG. 1 illustrates the heat and flame resistant zone 110 being a smaller thickness than the voluminous bulking zone 120, the relative thickness of the two zones can have a substantially different than as shown.

Referring still to FIG. 1, the heat and flame resistant zone 110 contains both the heat and flame resistant fibers 101 and the bulking fibers 102. However, the heat and flame resistant zone 110 primarily contains the heat and flame resistant fibers 101. Additionally, the distribution of the fibers in the heat and flame resistant zone 110 is such that the concentration of the heat and flame resistant fibers 101 is greater at the outer boundary 111 of the heat and flame resistant zone 110 than the inner boundary 112 of that zone. Also, as illustrated, it is preferred that the concentration of the heat and flame resistant fibers 101 decreases in a gradient along the z-axis from the outer boundary 111 of the heat and flame resistant zone 110 to the inner boundary 112 of that zone.

Still referring to FIG. 1, the voluminous bulking zone 120 contains both the heat and flame resistant fibers 101 and the bulking fibers 102. However, the voluminous bulking zone 120 primarily contains the bulking fibers 102. Additionally, the distribution of the fibers in the voluminous bulking zone 120 is such that the concentration of the bulking fibers 102 is greater at the outer boundary 121 of the voluminous bulking zone 120 than the inner boundary 122 of that zone. Also, as illustrated, it is preferred that the concentration of the bulking fibers 102 decreases in a gradient along the z-axis from the outer boundary 121 of the voluminous bulking zone 120 to the inner boundary 122 of that zone.

Referring now to FIG. 2, there is shown an enlarged cross-sectional view of another embodiment of the present invention, illustrated as a heat and flame shield material 200. As illustrated, the shield material 200 generally contains heat and flame resistant fibers 201 and bulking fibers 202. The heat and flame resistant fibers 201 and the bulking fibers 202 are staple fibers that are combined to form the shield material 200. In one embodiment, the heat and flame resistant fibers 201 and the bulking fibers 202 are air-laid with a binder fiber 205, and the combination of fibers is heated to activate the binder fiber 205 for bonding together the fibers of the shield material 200. An additional benefit of using the binder fiber 205 in the shield material 200 is that the shield material 200 can be subsequently molded to part shapes for use in automotive hood liners, engine compartment covers, etc.

Still referring to FIG. 2, the heat and flame resistant fibers 201 are concentrated in a heat and flame resistant zone 210 of the shield material 200, and the bulking fibers 202 are concentrated in a voluminous bulking zone 220 of the shield material 200. The heat and flame resistant zone 210 provides the shield material 200 with the primary heat and flame resistant attributes of the shield material 200. The voluminous bulking zone 220 provides the shield material 200 with the desired z-direction thickness.

Referring still to FIG. 2, the heat and flame resistant zone 210 has an outer boundary 211 located at the outer surface of the shield material 200, and an inner boundary 212 located adjacent to the voluminous bulking zone 220. The voluminous bulking zone 220 has an outer boundary 221 located at the outer surface of the shield material 200 and an inner boundary 222 located adjacent to the heat and flame resistant zone 210. The shield material 200 is a unitary material, and the boundaries of the two zones do not represent the delineation of layers, but areas within the unitary material. Because the shield material 200 is a unitary material, and the heat and flame resistant zone 210 and the voluminous bulking zone 220 are not discrete separate layers joined together, various individual fibers will occur in both the heat and flame resistant zone 210 and the voluminous bulking zone 220. Although FIG. 2 illustrates the heat and flame resistant zone 210 being a smaller thickness than the voluminous bulking zone 220, the relative thickness of the two zones can have a substantially different than as shown.

Still referring to FIG. 2, the heat and flame resistant zone 210 contains both the heat and flame resistant fibers 201 and the bulking fibers 202. However, the heat and flame resistant zone 210 primarily contains the heat and flame resistant fibers 201. Additionally, the distribution of the fibers in the heat and flame resistant zone 210 is such that the concentration of the heat and flame resistant fibers 201 is greater at the outer boundary 211 of the heat and flame resistant zone 210 than the inner boundary 212 of that zone. Also, as illustrated, it is preferred that the concentration of the heat and flame resistant fibers 201 decreases in a gradient along the z-axis from the outer boundary 211 of the heat and flame resistant zone 210 to the inner boundary 212 of that zone.

Referring still to FIG. 2, the bulking fibers 202 of the shield material 200 comprise first bulking fibers 203 and second bulking fibers 204. In one embodiment, the first bulking fibers have a higher denier per filament, and/or mass per fiber, than the heat and flame resistant fibers 201, and the second bulking fibers 204 have a higher denier per filament, and/or mass per fiber, than the first bulking fiber 203 and the heat and flame resistant fibers 201. Also, the voluminous bulking zone 220 is divided into a first bulking zone 230 and a second bulking zone 240. The first bulking zone 230 has an outer boundary 231 located adjacent to the heat and flame resistant zone 210 and inner boundary 232 located adjacent to the second bulking zone 240. The second bulking zone 240 has an outer boundary 241 located adjacent to the outer surface of the shield material 200 and an inner boundary 242 located adjacent to the first bulking zone 230. As previously stated, the shield material 200 is a unitary material, and as such, the boundaries of the two bulking zones do not represent the delineation of layers, but areas with in the unitary material. Because the shield material 200 is a unitary material, and the first bulking zone 230 and the second bulking zone 240 are not discrete separate layers joined together, various individual fibers will occur in both the first bulking zone and the second bulking zone 240. Although FIG. 2 illustrates the heat and flame resistant zone 210 being a smaller thickness than the voluminous bulking zone 220, the relative thickness of the two zones can have a substantially different than as shown.

Still referring to FIG. 2, the first bulking zone 230 contains both the first bulking fibers 203 and the second bulking fibers 204. However, the first bulking zone 230 will contain more of the first bulking fibers 203 than the second bulking fibers 204. The distribution of the fibers in the first bulking zone 230 is such that the concentration of the first bulking fibers 203 increases in a gradient along the z direction from the outer boundary 231 of the first bulking zone 230 to a first bulking fiber concentration plane 235 located between the inner boundary 232 and the outer boundary of the first bulking zone. Also, as illustrated, it is preferred that the concentration of the first bulking fibers 203 decreases in a gradient along the z-axis from the first bulking fiber concentration plane 235 to the inner boundary 232 of that zone.

Referring still to FIG. 2, the second bulking zone 240 contains both the first bulking fibers 203 and the second bulking fibers 204. However, the second bulking zone 240 will contain more of the second bulking fibers 204 than the first bulking fibers 203. The distribution of the fibers in the second bulking zone 240 is such that the concentration of the second bulking fibers 204 is greater at the outer boundary 241 of the second bulking zone 240 than the inner boundary 242 of that zone. Also, as illustrated, it is preferred that the concentration of the second bulking fibers 204 decreases in a gradient along the z-axis from the outer boundary 241 of the second bulking zone 240 to the inner boundary 242 of that zone.

Still referring to FIG. 2, the first bulking zone 230 will also contain heat and flame resistant fibers 201. However, the first bulking zone 230 will contain more of the first bulking fibers 203 than the heat and flame resistant fibers 201. The heat and flame resistant zone 210 can have some amount of the second bulking fiber 204; however, the amount of second bulking fiber 204 in the heat and flame resistant zone 210 is significantly lower than the first bulking fibers 203. The second bulking zone 240 can also have some amount of the heat and flame resistant fibers 201; however, the amount of the heat and flame resistant fibers 201 in the second bulking zone is significantly lower than the first bulking fibers 203. An advantage of using the two distinct bulking fibers 203/204 (FIG. 2) over using a single bulking fiber 102 (FIG. 1), is that for the same respective weights of heat and flame resistant fibers 101/201 and voluminous bulking fibers 102/202, a shield material 200 having two types of bulking fibers 203 and 204 will have fewer heat and flame resistant fibers 201 located in the voluminous bulking zone 120/220 than a shield material 100 having only one type of bulking fiber 102.

Referring now to FIG. 3, there is shown a diagram of a particular piece of equipment 300 for the process to form the planar unitary heat and flame shield from FIGS. 1 and 2. A commercially available piece of equipment that has been found satisfactory in this process to form the claimed invention is the "K-12 HIGH-LOFT RANDOM CARD" by Fehrer A G, in Linz, Austria. The heat and flame resistant fibers 101/201 and the voluminous bulking fibers 102/202 are opened and blended in the appropriate proportions and enter an air chamber 310. In an embodiment using the binder fibers 105/205, the binder fibers 105/205 are also opened and blended with the heat and flame resistant fibers 101/201 and the bulking fibers 102/202 prior to introduction into the air chamber 310. In an embodiment where the voluminous bulking fibers 202 contain multiple types of bulking fibers 203/204, those multiple types of bulking fibers 203/204 are also opened and blended in the appropriate portions with the other fibers before introduction into the air chamber 310. The air chamber 310 suspends the blended fibers in air, and delivers the suspended and blended fibers to a roller 320. The roller 320 rotates and slings the blended fibers towards a collection belt 330. The spinning rotation of the roller 320 slings the heavier fibers a further distance along the collection belt 330 than it slings the lighter fibers. As a result, the mat of fibers collected on the collection belt 330 will have a greater concentration of the lighter fibers adjacent to the collection belt 330, and a greater concentration of the heavier fibers further away from the collection belt 330.

In the embodiment of the shield 100 illustrated in FIG. 1, the heat and flame resistant fibers 101 are lighter than the voluminous bulking fibers 102. Therefore, in the process illustrated in FIG. 3, the heat and flame resistant fibers 101 collect in greater concentration near the collection belt 330, and the voluminous bulking fibers 102 collect in greater concentration away from the collection belt 330. It is this distribution by the equipment 300 that creates the heat and flame resistant zone 110 and the voluminous bulking zone 120 of the planar unitary shield material 100.

In the embodiment of the shield 200 illustrated in FIG. 2, the heat and flame resistant fibers 201 are lighter than the voluminous bulking fibers 202. Therefore, in the process illustrated in FIG. 3, the heat and flame resistant fibers 201 collect in greater concentration near the collection belt 330, and the voluminous bulking fibers 202 collect in greater concentration away from the collection belt 330. It is this distribution by the equipment 300 that creates the heat and flame resistant zone 210 and the voluminous bulking zone 220 of the planar unitary shield material 200. Additionally, the first bulking fibers 203 of the voluminous bulking fibers 220 are lighter than the second bulking fibers 204. Therefore, in the process illustrated in FIG. 3, the first bulking fibers 203 are collected in greater concentration nearer the collection belt 330 than the second bulking fibers 204. It is this distribution that creates the first bulking zone 230 and the second bulking zone 240 of the voluminous bulking zone 220 of the planar unitary shield material 200.

In one example of the present invention, planar unitary heat and flame resistant shield material was formed from a blend of four fibers including:

1) 4% by weight of a heat and flame resistant fiber being 2 dpf partially oxidized polyacrylonitrile
2) 25% by weight of a first bulking fiber being 6 dpf polyester
3) 41% by weight of a second bulking fiber being 15 dpf polyester, and
4) 30% by weight of a low melt binder fiber being 4 dpf core sheath polyester with a lower melting temperature sheath.

The fibers were opened, blended and formed into a shield material using a K-12 HIGH-LOFT RANDOM CARD" by Fehrer AG. The shield had a weight per square yard of about 16–32 ounces and a thickness in the range of about 12–37 mm. In the resulting shield material, the heat and flame resistant fibers in the heat and flame resistant zone comprised at least 70% of the total fibers in that zone, and the heat and flame resistant fibers in the voluminous bulking zone were less than about 2% of the total fibers in that zone.

Although the present invention has been described in considerable detail with reference to certain preferred versions thereof, other versions are possible. For example, an additional layer of material such as a nonwoven can be added to the outside surface or the inside surface of the present invention for additional purposes. Therefore, the spirit and scope of the appended claims should not be limited to the description of the preferred versions contained herein.

What is claimed is:

1. A heat and flame unitary planar shield material comprising:
 a plurality of heat and flame resistant fibers and a plurality of voluminous bulking fibers,
  said heat and flame resistant fibers and said voluminous bulking fibers being staple fibers,
 the unitary planar shield material including
  a first outer surface,
  a second outer surface,
  a heat and flame resistant zone extending from the first outer surface to a heat and flame resistant inner boundary, and
  a voluminous bulking zone extending from the second outer surface to a bulking zone inner boundary adjacent to the heat and flame resistant inner boundary,
 wherein the heat and flame resistant zone contains a portion of both the voluminous bulking fibers and the heat and flame resistant fibers with a higher portion of heat and flame resistant fibers than voluminous bulking fibers, wherein the concentration of heat and flame resistant fibers is greater near the first outer boundary than at the heat and flame resistant inner boundary, and wherein the concentration of the heat and flame resistant fibers decreases in a gradient along the direction from the first outer boundary to the heat and flame resistant inner boundary, and
 wherein the voluminous bulking zone contains a portion of both voluminous bulking fibers and the heat and flame resistant fibers with a higher portion of voluminous bulking fibers, wherein the concentration of voluminous bulking fibers is greater near the second outer boundary than at the voluminous bulking zone inner boundary, and wherein the concentration of the bulking fibers decreases in a gradient along the direction from the second outer boundary to the voluminous bulking zone inner boundary, and
 wherein the voluminous bulking fibers have a higher denier per filament than the heat and flame resistant fibers and
 further including binder fibers combined with the heat and flame resistance fibers and te voluminous bulking fibers.

2. A heat and flame unitary planar shield material comprising:
   a plurality of heat and flame resistant fibers, a plurality voluminous bulking fibers comprising first bulking fibers and second bulking fibers, said heat and flame resistant fibers, first bulking fibers, and second bulking fibers being staple fibers;
   the unitary planar shield material including
     a first outer surface,
     a second outer surface,
     a heat and flame resistant zone extending from the first outer surface to a heat and flame resistant inner boundary, and
     a voluminous bulking zone extending from the second outer surface to a bulking zone inner boundary adjacent to the heat and flame resistant inner boundary, the voluminous bulking zone having a first bulking zone and a second bulking zone, the first bulking zone extending from the bulking zone inner boundary to a first bulking zone inner boundary and having a first bulking fiber concentration plane there between, and the second bulking zone extending from the second outer surface to a second bulking zone inner boundary adjacent to the first bulking zone inner boundary;
   wherein the heat and flame resistant zone contains a portion of both the first bulking fibers and the heat and flame resistant fibers with a higher portion of heat and flame resistant fibers than first bulking fibers, wherein the concentration of heat and flame resistant fibers is greater near the first outer boundary than at the heat and flame resistant inner boundary; and
   wherein the first bulking zone contains a portion of the first bulking fibers, the second bulking fibers, and the heat and flame resistant fibers, with a higher portion of first bulking fibers, wherein the concentration of first bulking fibers increases in from the bulking zone inner boundary to the first bulking fiber concentration plane and decreases from the first bulking fiber concentration plane to the first bulking zone inner boundary; and
   wherein the second bulking zone contains a portion of the first bulking fibers and the second bulking fibers with a higher portion of second bulking fibers, wherein the concentration of second bulking fibers is greater near the second outer boundary than at the second bulking zone inner boundary.

3. The heat and flame unitary planar shield material of claim 1, wherein the voluminous bulking fibers are selected from the group consisting of high crimp fibers and hollow fill fibers.

4. The heat and flame unitary planar shield material of claim 1, wherein the binder fibers bind the fibers of the shield material.

5. The heat and flame unitary planar shield material of claim 1, wherein the heat and flame resistant zone has a smaller thickness than the voluminous bulking zone.

6. The heat and flame unitary planar shield material of claim 1, wherein the heat and flame resistance zone primarily contains the heat and flame resistant fibers.

7. The heat and flame unitary planar shield material of claim 1, wherein the voluminous bulking zone primarily contains the voluminous bulking fibers.

8. The heat and flame unitary planar shield material of claim 2, further including binder fibers combined with the heat and flame resistance fibers and the voluminous bulking fibers.

9. The heat and flame unitary planar shield material of claim 8, wherein the binder fibers bind the fibers of the shield material.

10. The heat and flame unitary planar shield material of claim 2, wherein the heat and flame resistant fibers are concentrated in the heat and flame resistant zone and the bulking fibers are concentrated in the voluminous bulking zone.

11. The heat and flame unitary planar shield material of claim 2, wherein the heat and flame resistant zone has a smaller thickness than the voluminous bulking zone.

12. The heat and flame unitary planar shield material of claim 2, wherein the heat and flame resistant zone primarily contains heat and fire resistant fibers.

13. The heat and flame unitary planar shield material of claim 2, wherein the concentration of the heat and flame resistant fibers decreases in a gradient along the direction from the first outer surface to the heat and flame resistant inner boundary.

14. The heat and flame unitary planar shield material of claim 2, wherein the first bulking fibers have a higher mass per filament than the heat and flame resistant fibers, and wherein the second bulking fibers have a higher mass per filament than the first bulking fibers and the heat and flame resistant fibers.

15. The heat and flame unitary planar shield material of claim 2, wherein the first bulking fibers have a higher denier per filament than the heat and flame resistant fibers, and wherein the second bulking fibers have a higher denier per filament than the first bulking fibers and the heat and flame resistant fibers.

16. The heat and flame unitary planar shield material of claim 2, wherein the concentration of the first bulking fibers increases in a gradient along the direction from the bulking zone inner boundary to a first bulking fiber concentration plane.

17. The heat and flame unitary planar shield material of claim 2, wherein the and wherein the concentration of the first bulking fibers decreases in a gradient along the direction from the first bulking fiber concentration plane to the first bulking zone inner boundary.

18. The heat and flame unitary planar shield material of claim 2, wherein the concentration of the second bulking fibers decreases in a gradient from the second outer surface to the second bulking zone inner boundary.

* * * * *

UNITED STATES PATENT AND TRADEMARK OFFICE
CERTIFICATE OF CORRECTION

| | | |
|---|---|---|
| PATENT NO. | : 7,153,794 B2 | |
| APPLICATION NO. | : 10/841148 | |
| DATED | : December 26, 2006 | |
| INVENTOR(S) | : David E. Wenstrup et al. | |

It is certified that error appears in the above-identified patent and that said Letters Patent is hereby corrected as shown below:

In column 6, line 66 after the word "and.", delete the letters "te" and insert the word --the--.

Signed and Sealed this

Twentieth Day of March, 2007

JON W. DUDAS
*Director of the United States Patent and Trademark Office*